(12) United States Patent
Balsiger et al.

(10) Patent No.: US 12,140,213 B2
(45) Date of Patent: Nov. 12, 2024

(54) COMPOUND HARMONIC GEAR SYSTEM WITH DUAL OUTPUT ARMS

(71) Applicant: Hamilton Sundstrand Corporation, Charlotte, NC (US)

(72) Inventors: Derick S. Balsiger, Prescott Valley, AZ (US); Andrzej Ernest Kuczek, Bristol, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 557 days.

(21) Appl. No.: 17/399,289

(22) Filed: Aug. 11, 2021

(65) Prior Publication Data

US 2023/0048660 A1 Feb. 16, 2023

(51) Int. Cl.
*F16H 49/00* (2006.01)
*B64C 13/34* (2006.01)

(52) U.S. Cl.
CPC .......... *F16H 49/001* (2013.01); *B64C 13/34* (2013.01); *F16H 2049/003* (2013.01)

(58) Field of Classification Search
CPC .. F16H 49/001; F16H 2049/003; B64C 13/34
See application file for complete search history.

(56) References Cited

U.S. PATENT DOCUMENTS

| | | | |
|---|---|---|---|
| 9,915,334 B2* | 3/2018 | Balsiger | F16H 49/001 |
| 10,266,251 B2* | 4/2019 | Balsiger | G01D 5/147 |
| 10,400,878 B2 | 9/2019 | Balsiger et al. | |
| 10,883,590 B2 | 1/2021 | Balsiger et al. | |

FOREIGN PATENT DOCUMENTS

| | | | |
|---|---|---|---|
| EP | 3561337 A1 | 10/2019 | |
| EP | 3726096 A1 | 10/2020 | |

OTHER PUBLICATIONS

Extended European Search Report for EP Application No. 22174184. 6, dated Oct. 11, 2022, pp. 1-10.

* cited by examiner

*Primary Examiner* — William C Joyce
(74) *Attorney, Agent, or Firm* — CANTOR COLBURN LLP (57) ABSTRACT

A gear system, having: first and second ground gear; a drive shaft disposed along a rotation axis of the gear system and configured to rotate about the rotation axis; and an output gear supported by the first and second ground gear and configured to rotate by engagement between a wave generator portion of a drive shaft, a wave generator bearing, a flex spline, the output gear and the first and second ground gear, the output gear defining: an output gear body; and first and second output arms respectively extending radially outward from opposite sides of the output gear body to respectively define first and second radial inner ends and radial outer ends of the first and second output arms, so that the first and second radial outer ends are disposed on a radial axis that extends through a radial center of the gear system.

16 Claims, 10 Drawing Sheets

COMPOUND HARMONIC GEAR SYSTEM WITH DUAL OUTPUT ARMS

STATEMENT OF FEDERAL SUPPORT

This invention was made with Government support under Government Contract No. W911W6-19-C-0029 awarded by Department of the Army. The Government has certain rights in the invention.

BACKGROUND

Exemplary embodiments pertain to the art of gear systems and more specifically to a compound harmonic gear system with dual output arms.

Compound harmonic gear systems are configured to provide hinge-line compound harmonics and may achieve higher power density compared with other gear systems. However, compound harmonic gear systems designed with a single output arm can lead to an unbalanced load and large reactive forces in the arm.

BRIEF SUMMARY

Disclosed is a gear system, including: first and second ground gear; a drive shaft disposed along a rotation axis of the gear system and configured to rotate about the rotation axis; and an output gear supported by the first and second ground gear and configured to rotate by engagement between a wave generator portion of a drive shaft, a wave generator bearing, a flex spline, the output gear and the first and second ground gear, the output gear defining: an output gear body; and first and second output arms respectively extending radially outward from opposite sides of the output gear body to respectively define first and second radial inner ends and radial outer ends of the first and second output arms, so that the first and second radial outer ends are disposed on a radial axis that extends through a radial center of the gear system.

In addition to one or more aspects of the system, or as an alternate, the output gear body defines an output gear aperture boundary, which defines an output gear aperture through which the wave generator portion of the drive shaft, the wave generator bearing and the flex spline extend.

In addition to one or more aspects of the system, or as an alternate, the first ground gear defines a first ground gear body that is ring shaped; the first ground gear body defines a first ground gear aperture boundary, which defines a first ground gear aperture through which the wave generator portion of the drive shaft, the wave generator bearing and the flex spline extend.

In addition to one or more aspects of the system, or as an alternate, the first ground gear is disposed on a first side of the output gear along the rotation axis; the second ground gear on a second side of the output gear along the rotation axis, wherein the first and second ground gears are connected to each other with the output gear therebetween along the rotation axis; and the second ground gear is a same shape as the first ground gear such that the second ground gear defines: a second ground gear body with a second ground gear aperture boundary that defines a second ground gear aperture.

In addition to one or more aspects of the system, or as an alternate, the wave generator portion of the drive shaft is defined at a first axial end of the drive shaft, and aligned along the rotation axis with the first and second ground gear apertures; and an input shaft portion of the drive shaft is defined at a second axial end of the drive shaft, wherein the input shaft portion is cylindrical, and the first and second axial ends are adjacent along the rotation axis.

In addition to one or more aspects of the system, or as an alternate, the wave generator bearing disposed radially around the wave generator portion of the drive shaft, and aligned along the rotation axis with the first and second ground gear apertures.

In addition to one or more aspects of the system, or as an alternate, the flex spline is located between the wave generator bearing and the first and second ground gear aperture boundaries, and aligned along the rotation axis with the first and second ground gear apertures, and wherein, during rotation of the input shaft portion of the drive shaft: the flex spline is engaged by the wave generator portion of the drive shaft; and the output gear is driven to rotate from engagement of the flex spline with the output gear and the first and second ground gear.

In addition to one or more aspects of the system, or as an alternate, the first ground gear includes a first set of mount segments, including first and second mount segments, that extend along the rotation axis from the first ground gear body, and are circumferentially spaced apart from each other about the first ground gear body to define rotation limiters for the first and second output arms.

In addition to one or more aspects of the system, or as an alternate, the first and second output arms are shaped to respectively taper from the first and second radial inner ends to the first and second radial outer ends; and the first and second inner ends alternatively engage the first and second mount segments during rotation of the output gear to thereby limit motion of the output gear.

In addition to one or more aspects of the system, or as an alternate, the second ground gear defines a second set of mount segments, including third and fourth mount segments, that extend along the rotation axis from the second ground gear body; and the first mount segment is fixed to the third mount segment, and the second mount segment is fixed to the fourth mount segment, whereby the first and second ground gears are connected to each other.

In addition to one or more aspects of the system, or as an alternate, the wave generator portion of the drive shaft, the wave generator bearing, and the flex spline extend through the first ground gear aperture, the output gear aperture and the second ground gear aperture and have a same length along the rotation axis.

In addition to one or more aspects of the system, or as an alternate, the mount segments define ground gear mounting features; and the output arms define output arm mounting features, whereby the gear system is configured to mount to a movable component to a stationary structure.

Further disclosed is an aircraft system including: a stationary structure; and a movable component mounted to the stationary structure via a gear system having one or more of the above disclosed aspects.

In addition to one or more aspects of the aircraft system, or as an alternate, the movable component is a control surface.

In addition to one or more aspects of the aircraft system, or as an alternate, the aircraft system includes a motor operationally connected to the drive shaft.

Further disclosed is a method of transmitting rotational motion to a movable component via a gear system, including: connecting a stationary structure to first and second ground gear of the gear system, wherein the gear system includes: a drive shaft disposed along a rotation axis of the gear system; and an output gear supported by the first and second ground gear and configured to rotate by engagement between a wave generator portion of the drive shaft, a wave generator bearing, a flex spline, the first and second ground gear and the output gear, the output gear defining: an output gear body; and first and second output arms respectively extending radially outward from circumferentially opposite portions of the output gear body to respectively define first and second radial inner ends and radial outer ends of the first and second output arms, so that the first and second radial outer ends are disposed on a radial axis that extends through a radial center of the gear system; connecting the movable component to the first and second output arms of the output gear of the gear system; and rotating the drive shaft disposed along the rotation axis of the gear system, and rotationally driving the output gear from rotation of the drive shaft.

In addition to one or more aspects of the method, or as an alternate, the method includes connecting a motor to an input shaft portion of the drive shaft prior to rotating the drive shaft and rotating the drive shaft with the motor.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
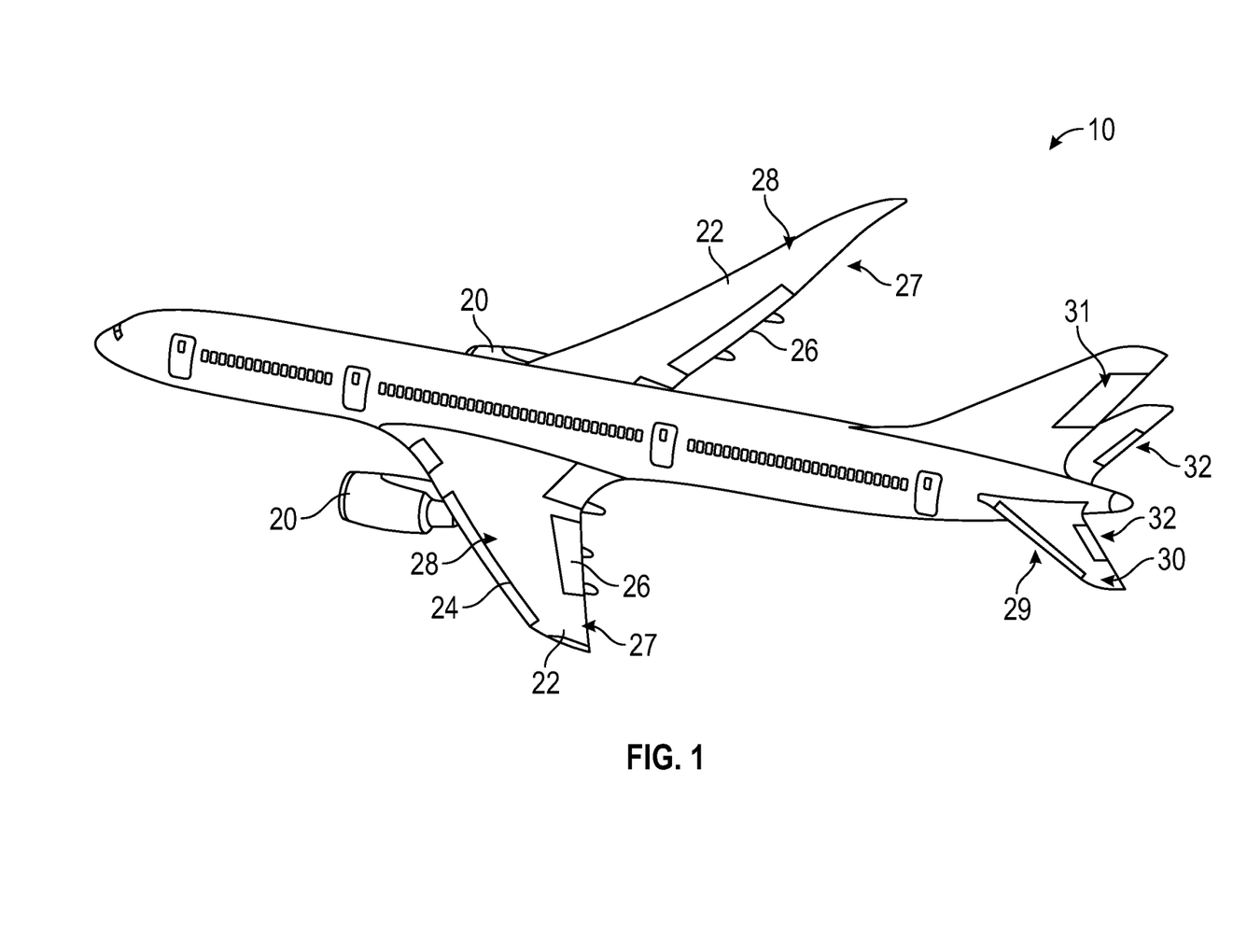
FIG. 1 is a perspective view of an aircraft where embodiments of the present invention can be implemented.

FIG. 1 illustrates an example of a commercial aircraft 10 having an aircraft engine 20 surrounded by (or otherwise carried in) a nacelle. The commercial aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems.

As indicated, compound harmonic gear systems can be useful to control motion of aircraft components such as the control surfaces identified above. However, these systems may have unbalanced loads and large reactive forces if they are designed with a single output arm. These loads may result in a binding of the gears and may require a relatively robust structure to prevent material failure.

Figure 2:
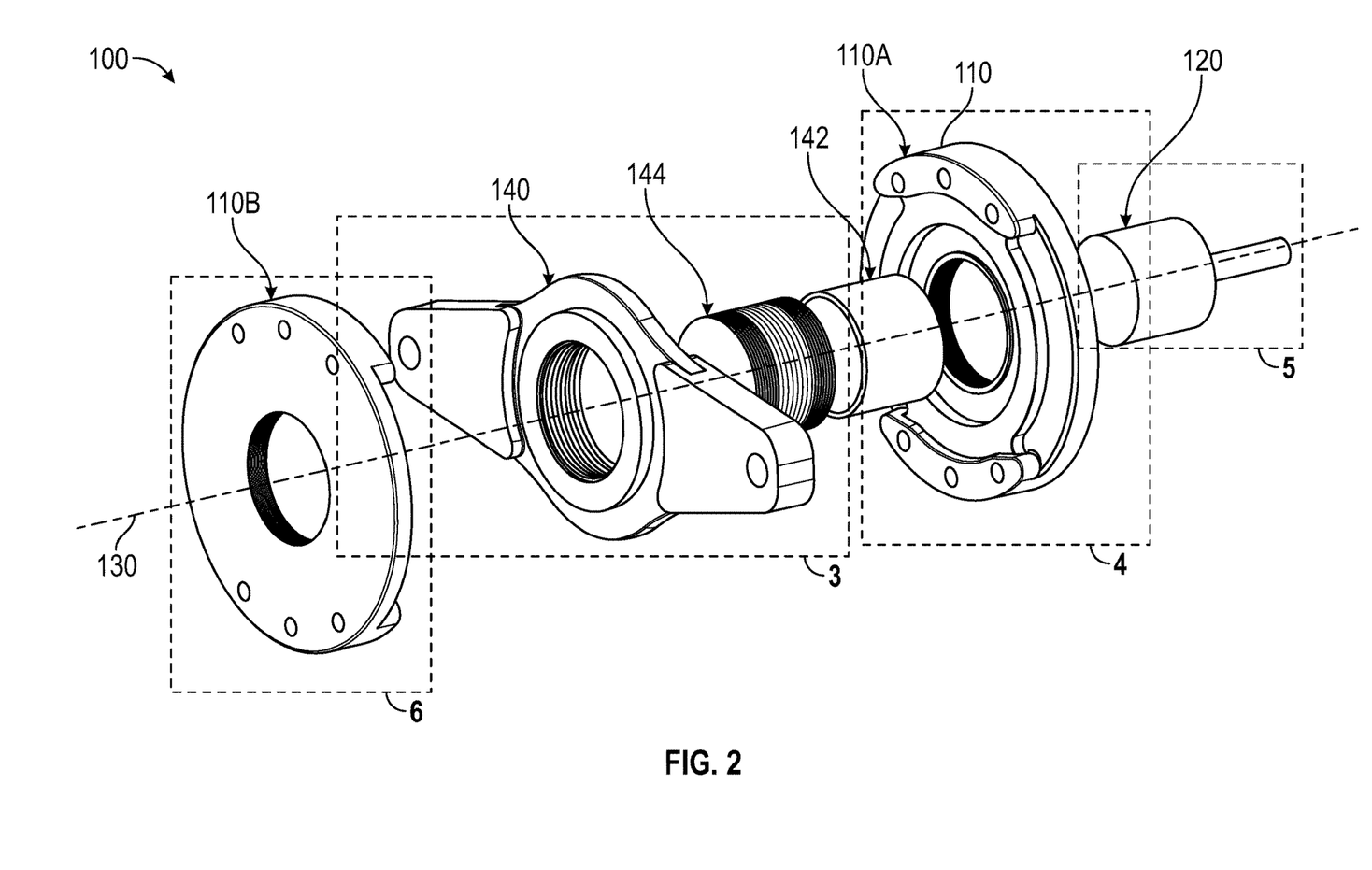
FIG. 2 is an exploded view of a gear system according to an embodiment.

In view of these concerns, turning to FIG. 2, an exploded view of a gear system 100 is shown. The gear system 100 can receive power via a drive shaft 120 and transfer the power to an output gear 140, e.g., to drive a control surface of an aircraft. The gear system 100 includes first and second ground gears 110A, 110B (generally referenced as 110). A drive shaft 120 is disposed along a rotation axis 130 of the gear system 100 and is configured to rotate about the rotation axis 130. An output gear 140 is supported by the first and second ground gear 110A, 110B and configured to rotate by engagement with the drive shaft 120 via a wave generator bearing 142 and a flex spline 144, as discussed in greater detail below.

Figure 3:
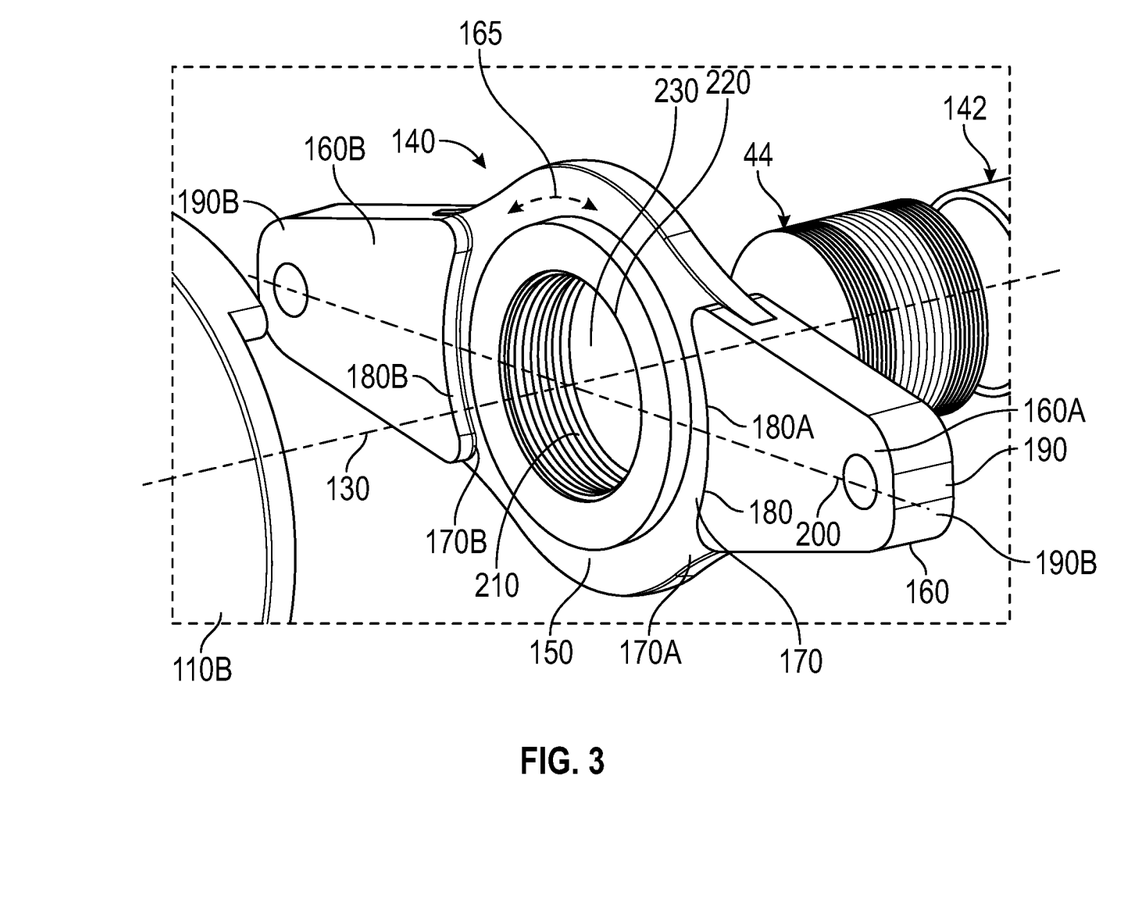
FIG. 3 shows an output gear of the gear system.

Turning to FIG. 3, the output gear 140 is shown, along with the wave generator bearing 142, the flex spline 144 and portions of the second ground gear 110B, all disposed along the rotation axis 130. The output gear 140 defines an output gear body 150. First and second output arms 160A, 160B (generally referenced as 160) extend radially outward from opposite sides of the output gear body 150, e.g., from first and second portions 170A, 170B (generally referenced as 170) of the output gear body 150. The output arms 160 respectively define first and second radial inner ends 180A, 180B (generally referenced as 180) and radial outer ends 190A, 190B (generally referenced as 190). From this configuration, the radial outer ends 190 are disposed on a radial axis 200 that extends through a radial center 210 of the gear system 100. The output gear body 150 defines an output gear aperture boundary 220, which defines an output gear aperture 230 through which the drive shaft 120 extends (FIG. 2). The output arms 160 are shaped to respectively taper from the radial inner ends 180 to the radial outer ends 190. The shape of the output arms 160 is substantially an isosceles trapezoid with rounded corner edges, with the radial outer ends 190 being the small base of the trapezoid and the radial inner ends 180 being the large base of the trapezoid.

Figure 4:
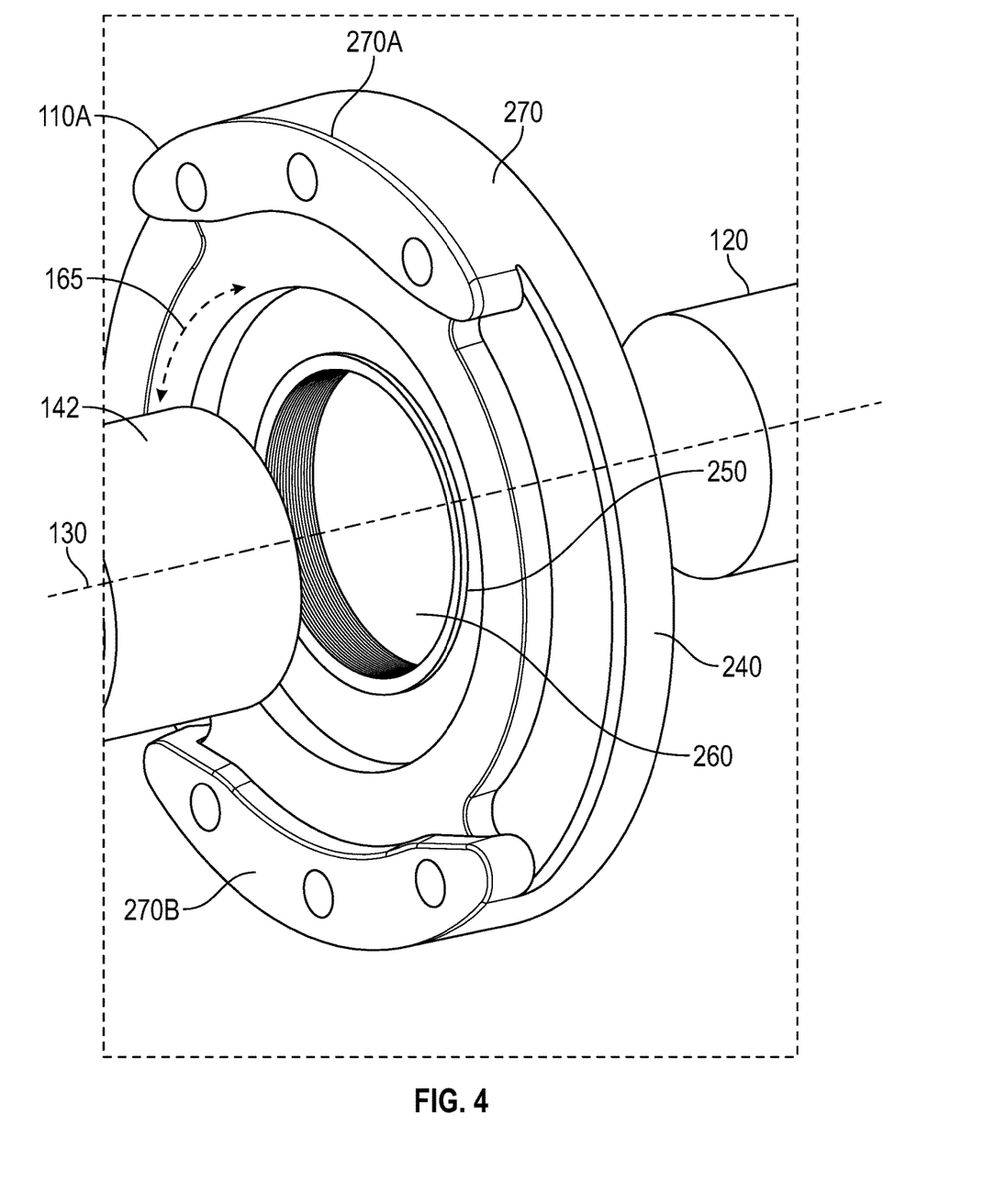
FIG. 4 shows a first ground gear of the gear system.

Turning to FIG. 4, the first ground gear 110A is shown along with portions of the drive shaft 120 and the wave generator bearing 142, all disposed along the rotation axis 130. The first ground gear 110A defines a first ground gear body 240 that is ring shaped. The first ground gear body 240 defines a first ground gear aperture boundary 250, which defines a first ground gear aperture 260 through which the drive shaft 120 extends.

The first ground gear 110A includes first and second mount segments 270A, 270B (generally referenced as first set of mount segments 270). The first set of mount segments 270 extend along the rotation axis 130 from the first ground gear body 240, toward the output gear 140 (FIG. 2). The first set of mount segments 270 are circumferentially spaced apart (along the circumferential direction 165) from each other about the first ground gear body 240. The first set of mount segments 270 define rotation limiters (or stops) for the output arms 160. That is, as the output arms 160 move circumferentially during rotation, the radial inner ends 180 of the output arms 160 (FIG. 4) will abut circumferential ends of the first set of mount segments 270 to prevent continuing rotation in a direction of rotational motion, to thereby limit motion of the output gear (FIG. 7).

Figure 5:
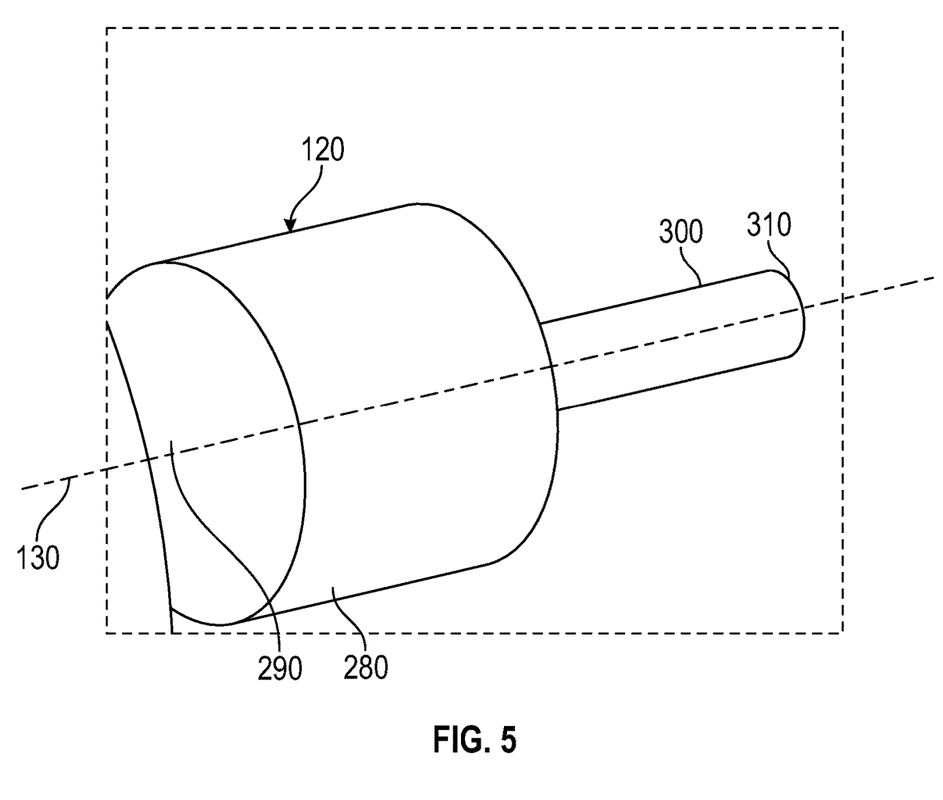
FIG. 5 shows a drive shaft of the gear system.

Turning to FIG. 5, the drive shaft 120 is shown along the rotation axis 130. The drive shaft 120 defines a wave generator portion 280 at a first axial end 290 of the drive shaft 120, aligned along the rotation axis 130 with the first ground gear aperture 260 (FIG. 4). An input shaft portion 300 is at a second axial end 310 of the drive shaft 120. The input shaft portion 300 is cylindrical in shape. The first and second axial ends 290, 310 are adjacent to each other along the rotation axis 130. The input shaft portion 300 is driven by a motor 400 (discussed below).

Figure 6:
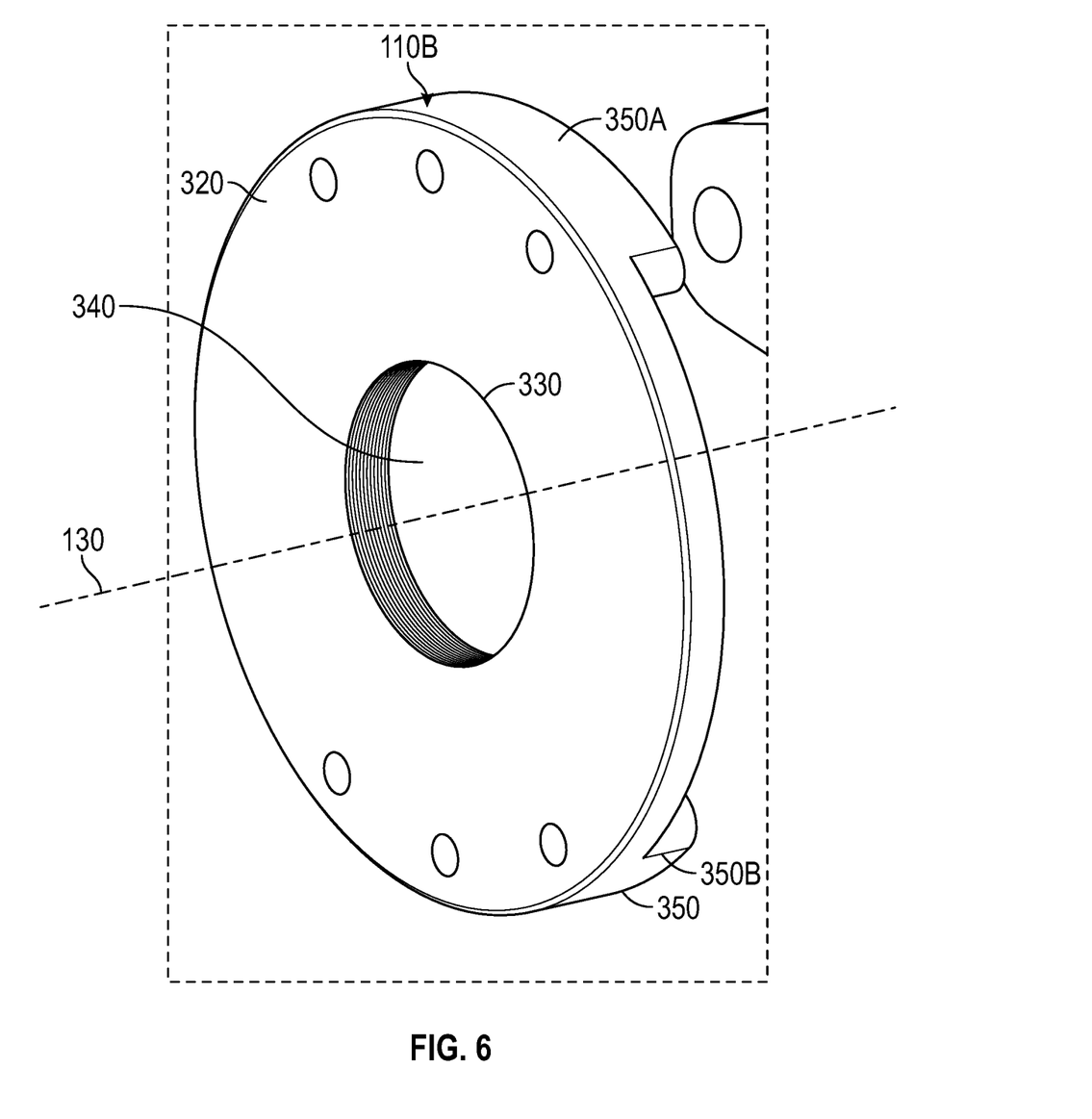
FIG. 6 shows a second ground gear of the gear system.

Turning back to FIG. 2, the first ground gear 110A is disposed on a first side of the output gear 140 along the rotation axis 130. The second ground gear 110B is located on a second side of the output gear 140 along the rotation axis 130. The ground gears 110 are connected to each other with the output gear 140 therebetween along the rotation axis 130. Turning to FIG. 6, the second ground gear 110B is shown along the rotation axis 130. The second ground gear 110B is a same shape and size as the first ground gear 110A. As such, the second ground gear 110B defines a second ground gear body 320 with a second ground gear aperture boundary 330 that defines a second ground gear aperture 340. Third and fourth mount segments 350A, 350B (generally referred to as a second set of mount segments 350) extend along the rotation axis 130 from the second ground gear body 320, toward the output gear 140.

Figure 7:
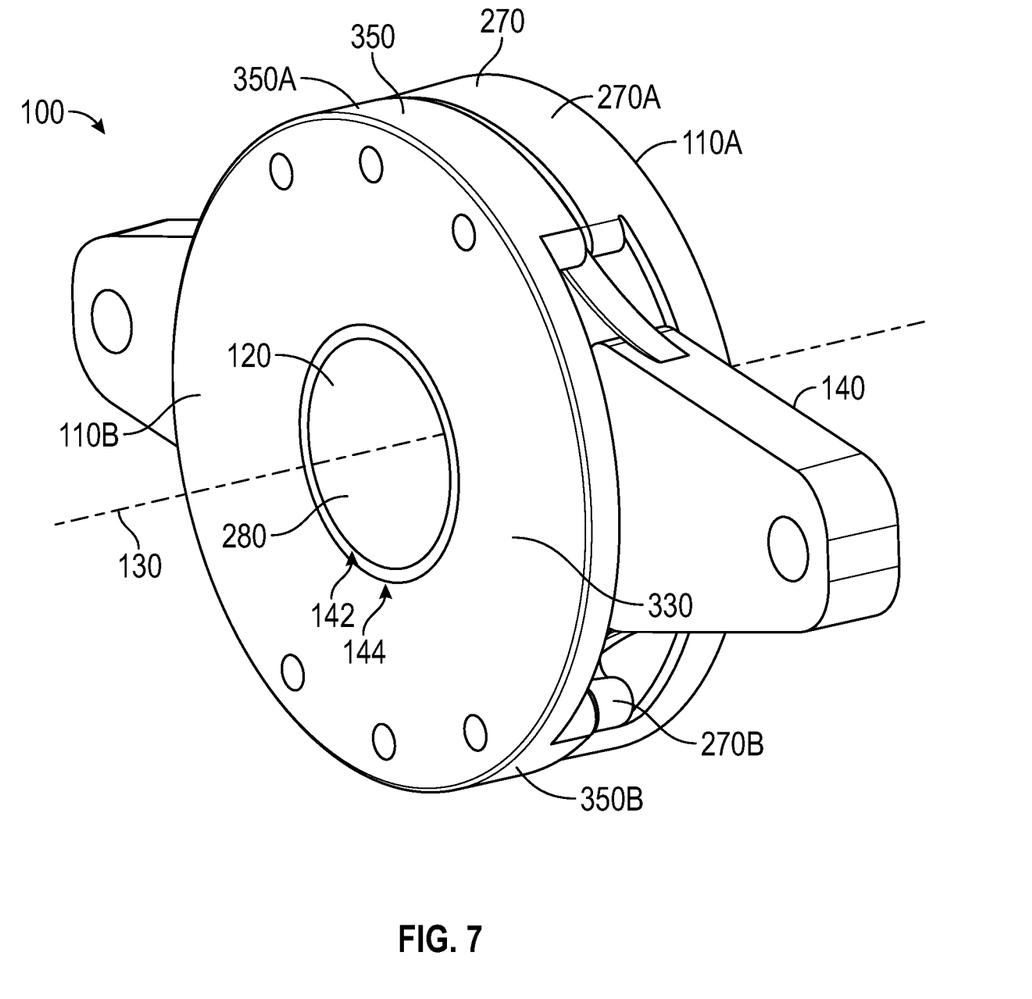
FIG. 7 shows an assembly view of the gear system.

The wave generator bearing 142 is radially exterior to the wave generator portion 280 of the drive shaft 120 and is aligned along the rotation axis 130 with the first ground gear aperture 260 (see also FIG. 7). The flex spline 144 is radially between the wave generator bearing 142 and the first and second ground gear aperture boundaries 250, 330 and is aligned along the rotation axis 130 with the first and second ground gear apertures 260, 340 (see also FIG. 7). With the disclosed configuration, during rotation of the input shaft portion 300 of the drive shaft 120, the flex spline 144 is engaged by the wave generator portion 280 of the drive shaft 120. From this, the output gear 140 is driven to rotate from engagement of the flex spline 144 with the output gear 140 and the first and second ground gear 110A, 110B as discussed below (see FIG. 9).

As shown in FIG. 7, which is an assembly view of the gear system 100, the first and second set of mount segments 270, 350 are fixed to each other. From this, the first and second ground gears 110A, 110B are connected to each other. In addition, the wave generator portion 280 of the drive shaft 120, the wave generator bearing 142, and the flex spline 144 extend through the first ground gear aperture 260 (FIG. 4), the output gear aperture 230 (FIG. 3) and the second ground gear aperture 330. To provide for proper inter fitting of these components, the wave generator portion 280 of the drive shaft 120 (FIG. 2), the wave generator bearing 142, and the flex spline 144 have a same length along the rotation axis 130.

Figure 8:
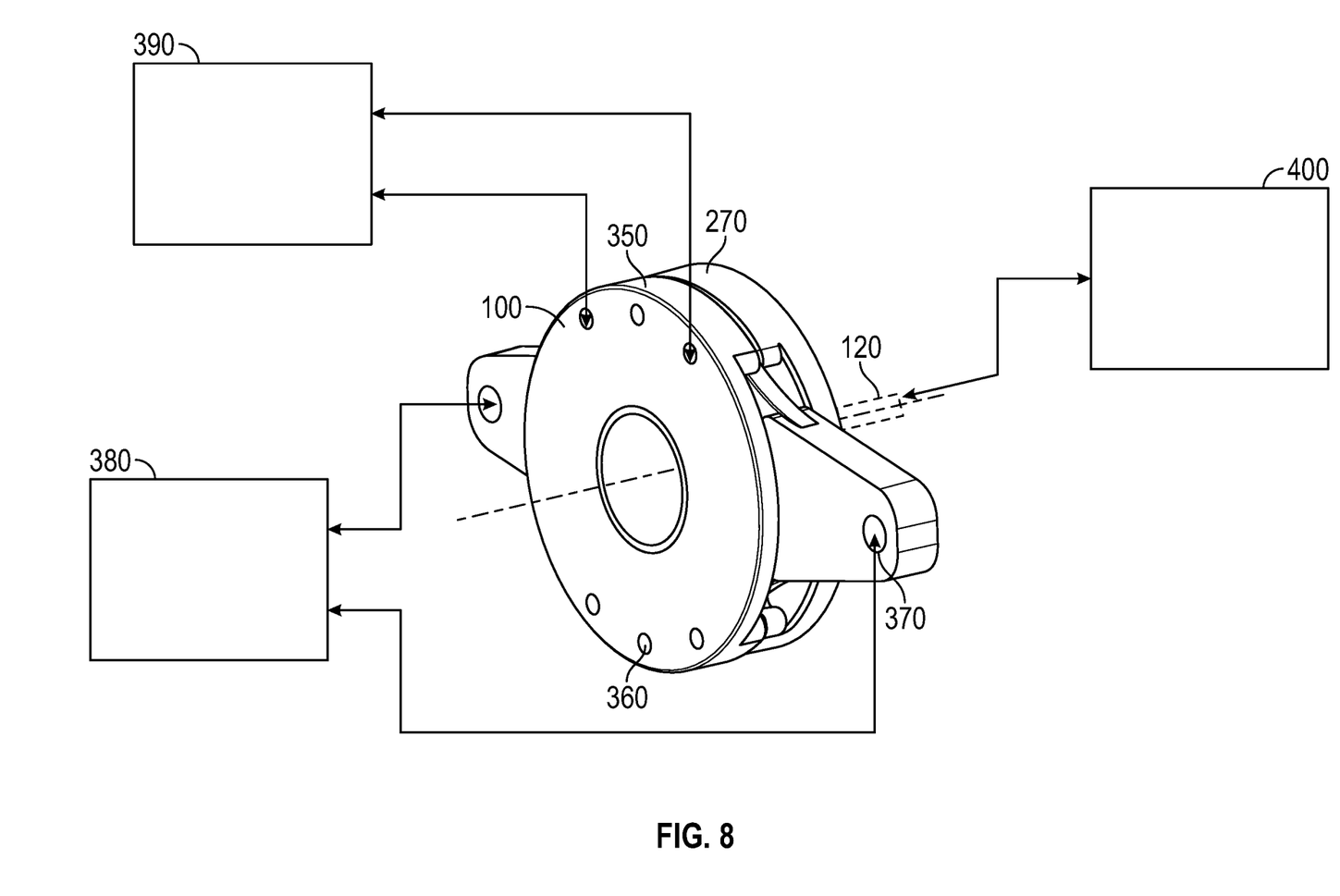
FIG. 8 shows the gear system connected to a motor, a stationary structure and a movable component.

Turning to FIG. 8, the first and second sets of mount segments 270, 350 have ground gear mounting features 360 such as through-holes. The output arms 160 define output arm mounting features 370, which may also be through-holes. From this configuration, the gear system 100 is configured to mount to a movable component 380 and to a stationary structure 390. The stationary structure 390 may be, for example, within an aircraft 10 (FIG. 1) and the movable component 380 may be a control surface such as a flap or slat. A motor 400 may be operationally connected to the drive shaft 120 to enable rotation of the movable component 380 via the gear system 100.

Figure 9:
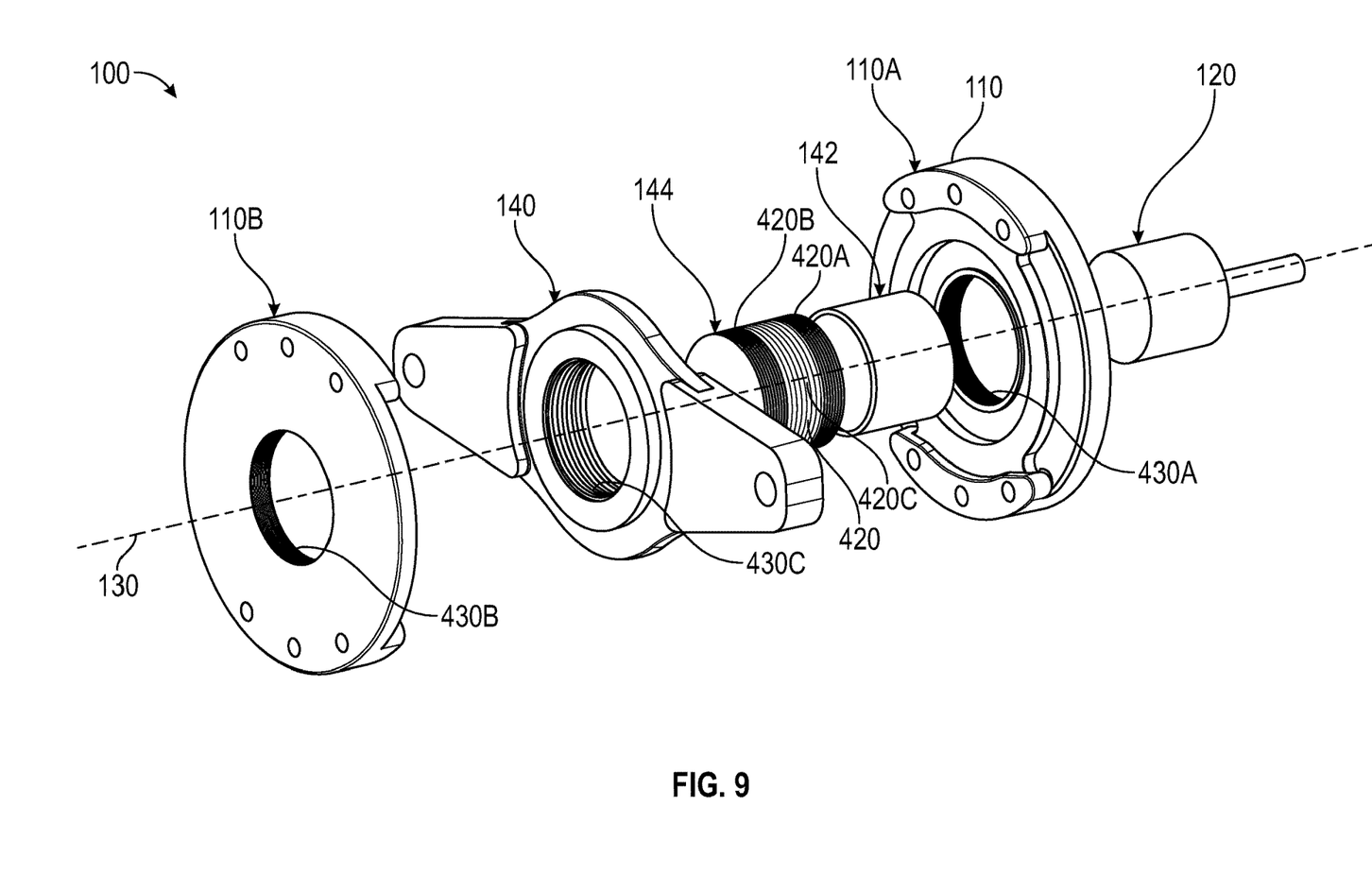
FIG. 9 shows aspects of the embodiments that provide for compound harmonic motion.

Turning to FIG. 9, aspects of the embodiments that provide for compound harmonic motion through the system 100 are shown. FIG. 9 generally shows the drive shaft 120, the ground gear 110, the output gear 140, the wave generator bearing 142, and the flex spline 144. The flex spline 144 includes a plurality of splines 420 (e.g., FIG. 4) to thereby form a compound spline. For example, the flex spline 144 includes a first ground spline 420A, a second ground spline 420B and an output spline 420C. The second ground spline 420B is axially offset from the first ground spline 420A. The output spline 420C is axially intermediate the first ground spline 420A and the second ground spline 420B. Each of the first ground spline 420A, the second ground spline 420B and the output spline 420C are outer facing splines.

The first ground gear 110A includes first ground gear teeth 430A. The first ground gear teeth 430A mesh with the first ground spline 420A. The second ground gear 110B includes second ground gear teeth 430B. The second ground gear teeth 430B mesh with the second ground spline 420B. The output gear 140 includes output gear teeth 430C. The output gear teeth 430C mesh with the output spline 420C. Each of the first ground gear teeth 430A, the second ground gear teeth 430B and the output gear teeth 430C are inner facing teeth.

The plurality of splines 420 are configured to mesh with the ground gears 110 and the output flange 140 according to different gear ratios. The first ground spline 420A and the first ground gear teeth 430A have a first gear ratio (Ratio 1, below). The second ground spline 420B and the second ground gear teeth 430B also have the first gear ratio. The output spline 420C and the output gear teeth 430C have a second gear ratio (Ratio 2, below) that differs from the first gear ratio. The splines 420 are integral to same structure, that is, the flex spline 144. Thus the different gear ratios together form a compound gear ratio (Compound Ratio, below). The compound gear ratio provides a differential motion between the ground gears 110 and the output gear 140.

The compound gear ratio is represented as the difference of the individual gear ratios:

$$\text{Ratio 1} = \frac{\text{Teeth in Output Spline (420}c)}{\text{Teeth in Output Spline (420}c) - \text{Teeth in } Outpt \text{ Flange (430}C)}$$

$$\text{Ratio 2} = \frac{\text{Teeth in First Ground Spline (420}a)}{\text{Teeth in First Ground Spline (420}a) - \text{Teeth in First Ground Gear (430}a)}$$

$$\text{Compound Ratio} = \frac{1}{\frac{1}{\text{Ratio 1}} - \frac{1}{\text{Ratio 2}}}$$

Figure 10:
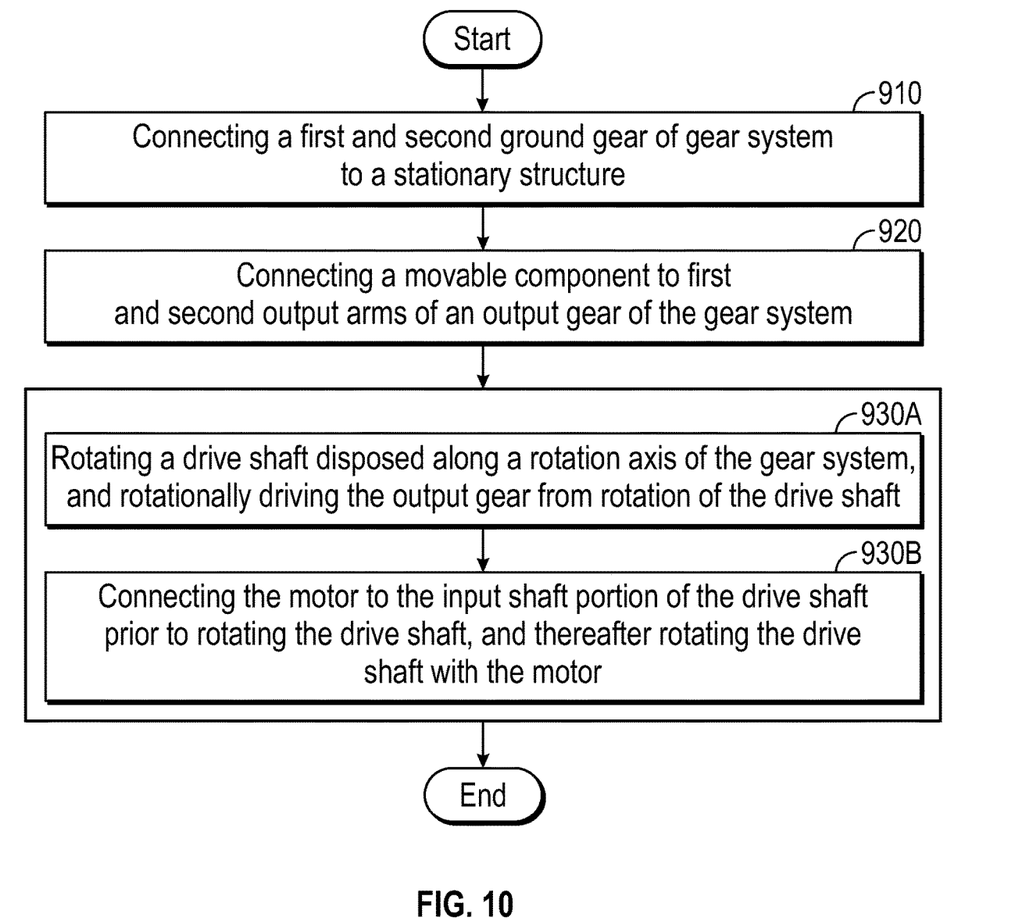
FIG. 10 is a flowchart showing a method of rotationally driving a movable component with the gear system.

FIG. 10 is a flowchart showing a method of transmitting rotational motion to a movable component 380. As shown in block 910, the method includes connecting the first and second ground gear 110A, 110B of the gear system 100 to a stationary structure 390. As shown in block 920, the method includes connecting the movable component to the first and second output arms 160A, 160B, of the output gear 140 of the gear system 100. As shown in block 930A, the method includes rotating the drive shaft 120 disposed along the rotation axis of the gear system 100, and rotationally driving the output gear 140 from rotation of the drive shaft 120. That is, as indicated, a wave generator portion 280 of the drive shaft 120 engages a wave generator bearing 142 and a flex spline 144, and thereby engages the output gear 140 and the ground gear 110A, 110B, to drive the output gear 140. In addition, as shown in block 930B, the method may include connecting the motor 400 to the input shaft portion 300 of the drive shaft 120 prior to rotating the drive shaft 120, and thereafter rotating the drive shaft 120 with the motor 400.

The embodiments disclosed herein provide dual output arms to provide a balanced load in compound harmonic gear system. In addition, dual output arms provide an additional structure to react loads, reducing the reactive forces in each arm compared with a single arm design. The lower reactive forces translate into lower deflections and can reduce the binding of the gear. In addition, with lower reactive forces, less structure is required, which leads to mass and weight reduction.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. A gear system, comprising:
   first and second ground gear;
   a drive shaft disposed along a rotation axis of the gear system and configured to rotate about the rotation axis; and
   an output gear supported by the first and second ground gear and configured to rotate by engagement between a wave generator portion of the drive shaft, a wave generator bearing, a flex spline, the output gear and the first and second ground gear,
   the output gear defining:
      an output gear body; and
      first and second output arms respectively extending radially outward from opposite sides of the output gear body to respectively define first and second radial inner ends and radial outer ends of the first and second output arms, so that the first and second radial outer ends are disposed on a radial axis that extends through a radial center of the gear system;
   wherein:
   the first ground gear defines a first ground gear body that is ring shaped, the first ground gear body defines a first ground gear aperture boundary, which defines a first ground gear aperture through which the wave generator portion of the drive shaft, the wave generator bearing and the flex spline extend, the first ground gear is disposed on a first side of the output gear along the rotation axis;
   the second ground gear is disposed on a second side of the output gear along the rotation axis, wherein the first and second ground gears are connected to each other with the output gear therebetween along the rotation axis,
   the second ground gear is a same shape as the first ground gear such that the second ground gear defines:
      a second ground gear body with a second ground gear aperture boundary that defines a second ground gear aperture;
   the first and second ground gear respectively include mounting features disposed on the radial axis that are configured to mount to a movable component; and
   the first ground gear includes a first set of mount segments, including first and second mount segments, that extend along the rotation axis from the first ground gear body, and are circumferentially spaced apart from each other about the first ground gear body and to define rotation limiters for the first and second output arms, and that are configured to mount to a stationary component.

2. The gear system of claim 1, wherein:
   the output gear body defines an output gear aperture boundary, which defines an output gear aperture through which the wave generator portion of the drive shaft, the wave generator bearing and the flex spline extend.

3. The gear system of claim 2, wherein:
   the wave generator portion of the drive shaft, the wave generator bearing, and the flex spline extend through the first ground gear aperture, the output gear aperture and the second ground gear aperture and have a same length along the rotation axis.

4. The gear system of claim 1, wherein:
   the wave generator portion of the drive shaft is defined at a first axial end of the drive shaft, and aligned along the rotation axis with the first and second ground gear apertures; and
   an input shaft portion of the drive shaft is defined at a second axial end of the drive shaft, wherein the input shaft portion is cylindrical, and the first and second axial ends are adjacent along the rotation axis.

5. The gear system of claim 4, wherein:
   the flex spline located between the wave generator bearing and the first and second ground gear aperture boundaries, and aligned along the rotation axis with the first and second ground gear apertures, and
   wherein, during rotation of the input shaft portion of the drive shaft:
      the flex spline is engaged by the wave generator portion of the drive shaft; and
      the output gear is driven to rotate from engagement of the flex spline with the output gear and the first and second ground gear.

6. The gear system of claim 1, wherein:
   the wave generator bearing disposed radially around the wave generator portion of the drive shaft, and aligned along the rotation axis with the first and second ground gear apertures.

7. The gear system of claim 1, wherein:
   the first and second output arms are shaped to respectively taper from the first and second radial inner ends to the first and second radial outer ends; and
   the first and second inner ends alternatively engage the first and second mount segments during rotation of the output gear to thereby limit motion of the output gear.

8. The gear system of claim 1, wherein:
   the second ground gear defines a second set of mount segments, including third and fourth mount segments, that extend along the rotation axis from the second ground gear body; and the first mount segment is fixed to the third mount segment, and the second mount segment is fixed to the fourth mount segment, whereby the first and second ground gears are connected to each other.

9. The gear system of claim 1, wherein:
the mount segments define ground gear mounting features; and
the output arms define output arm mounting features,
whereby the gear system is configured to mount to a movable component to a stationary structure.

10. An aircraft system comprising:
a stationary structure; and
a movable component mounted to the stationary structure via the gear system of claim 1.

11. The aircraft system of claim 10, wherein:
the movable component is a control surface.

12. The aircraft system of claim 10, further including:
a motor operationally connected to the drive shaft.

13. A method of transmitting rotational motion to a movable component via a gear system, comprising:
connecting a stationary structure to first and second ground gear of the gear system,
wherein the gear system includes:
a drive shaft disposed along a rotation axis of the gear system; and
an output gear supported by the first and second ground gear and configured to rotate by engagement between a wave generator portion of the drive shaft, a wave generator bearing, a flex spline, the first and second ground gear and the output gear, the output gear defining:
an output gear body; and
first and second output arms respectively extending radially outward from circumferentially opposite portions of the output gear body to respectively define first and second radial inner ends and radial outer ends of the first and second output arms, so that the first and second radial outer ends are disposed on a radial axis that extends through a radial center of the gear system;
connecting the movable component to the first and second output arms of the output gear of the gear system; and
rotating the drive shaft disposed along the rotation axis of the gear system, and rotationally driving the output gear from rotation of the drive shaft.

14. The method of claim 13, further comprising:
connecting a motor to an input shaft portion of the drive shaft prior to rotating the drive shaft and rotating the drive shaft with the motor.

15. A gear system, comprising:
first and second ground gear;
a drive shaft disposed along a rotation axis of the gear system and configured to rotate about the rotation axis; and
an output gear supported by the first and second ground gear and configured to rotate by engagement between a wave generator portion of the drive shaft, a wave generator bearing, a flex spline, the output gear and the first and second ground gear,
the output gear defining:
an output gear body; and
first and second output arms respectively extending radially outward from opposite sides of the output gear body to respectively define first and second radial inner ends and radial outer ends of the first and second output arms, so that the first and second radial outer ends are disposed on a radial axis that extends through a radial center of the gear system,
wherein the first ground gear includes a first set of mount segments, including first and second mount segments, that extend along the rotation axis from the first ground gear, and are circumferentially spaced apart from each other about the first ground gear, to define rotation limiters for the first and second output arms.

16. The gear system of claim 15, wherein:
the first and second output arms are shaped to respectively taper from the first and second radial inner ends to the first and second radial outer ends; and
the first and second inner ends alternatively engage the first and second mount segments during rotation of the output gear to thereby limit motion of the output gear.

\* \* \* \* \*